United States Patent [19]

George

[11] Patent Number: 4,469,803

[45] Date of Patent: Sep. 4, 1984

[54] REGENERATION PROCESS FOR POISONED CLAUS ALUMINA CATALYST, INCLUDING NAOH ACTIVATION

[75] Inventor: Zacheria M. George, Edmonton, Canada

[73] Assignee: Alberta Research Council, Edmonton, Canada

[21] Appl. No.: 471,198

[22] Filed: Mar. 1, 1983

[51] Int. Cl.³ .................. B01J 21/20; C01B 17/04
[52] U.S. Cl. ................................ 502/25; 423/576; 502/517
[58] Field of Search ............ 252/411 S, 412, 416, 252/419, 420; 423/576; 502/25, 26, 38, 517

[56] References Cited

U.S. PATENT DOCUMENTS 4,183,823  1/1980  George .................. 252/411 S
4,190,554  2/1980  Yamauchi et al. ........... 252/412

FOREIGN PATENT DOCUMENTS 416451  7/1925  Fed. Rep. of Germany ... 252/411 S

Primary Examiner—P. E. Konopka
Attorney, Agent, or Firm—Ernest Peter Johnson

[57] ABSTRACT

Poisoned catalyst is regenerated by first subjecting it to an oxidative burn-off and then soaking it in a base, preferably NaOH. The dried product is comparable in Claus activity to fresh catalyst.

4 Claims, 6 Drawing Figures

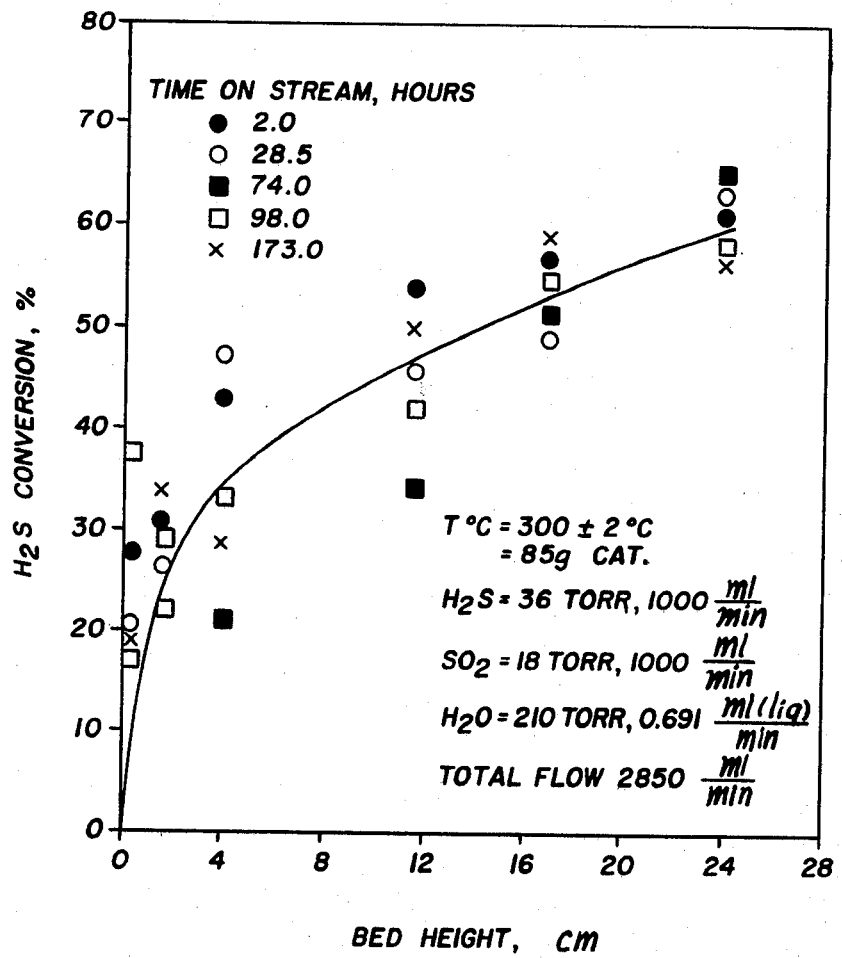

REGENERATION PROCESS FOR POISONED CLAUS ALUMINA CATALYST, INCLUDING NAOH ACTIVATION

FIELD OF THE INVENTION

This invention relates to a process for regenerating poisoned Claus alumina catalyst.

BACKGROUND OF THE INVENTION

A major source of elemental sulfur is sour natural gas processing in which the $H_2S$ and $CO_2$ are preferentially removed from the gas by absorption in ethanolamine or other solvents. Upon saturation, the acid gas (containing $H_2S$ and $CO_2$) is stripped from the amine solution.

Conversion of the toxic hydrogen sulfide to elemental sulfur and water is achieved by the modified Claus process. According to this process, the hydrogen sulfide is first oxidized with a stoichiometric amount of air in a reaction furnace at approximately 1200° C. Elemental sulfur, in an amount of 50-60% of the total sulfur content, is formed, along with water vapor, sulfur dioxide, carbonyl sulfide and carbon disulfide. The product stream is cooled to about 150° C. so that the elemental sulfur is condensed and can be removed. The remaining gas, having a stoichiometric ratio of $H_2S$ and $SO_2$ of 2:1, is then fed to a series of adiabatic Claus catalytic converters, where the Claus reaction (1) is practised.

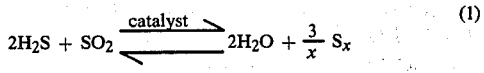

$$2H_2S + SO_2 \underset{\longleftarrow}{\overset{catalyst}{\longrightarrow}} 2H_2O + \frac{3}{x} S_x \qquad (1)$$

The Catalyst

Activated alumina catalyst, in the form of porous granules 4-10 mm. in diameter, is normally employed in the converters. The catalyst has a reported composition and surface area as follows:

TABLE I

| Component | Wt. % |
| --- | --- |
| $SiO_2$ | 0.02 |
| $Fe_2O_3$ | 0.02 |
| $Na_2O$ | 0.35 |
| Loss on ignition | 6.0 |
| $Al_2O_3$ | 93.6 |
| Surface area | 325 m$^2$/g |

With use, the catalyst loses its effectiveness. This deterioration arises from the generation and deposition of aluminum sulfate, carbon, and sulfur on the catalyst. High temperature and elevated partial pressure of water in the Claus reactors favour sintering of the catalyst. As a result, the surface area and activity of the catalyst can be reduced significantly.

By way of comparison, an exemplary analysis for a poisoned and regenerated catalyst is:

TABLE II

| Component | Wt. % (Poisoned) | Wt. % (Regenerated) |
| --- | --- | --- |
| Total sulfur as $SO_4^=$, % | 3.2 | 1.1 |
| Water soluble $SO_4^=$, % | 2.2 | |
| Carbon, % | 2.2 | Trace |
| $Al_2O_3$, % | 59.1 | 90.8 |
| Surface area, M$^2$/g | 88 | 158 |
| Pore vol., ml/g | >0.1 | 0.4 |
| Loss on ignition | 20.2 | 7.3 |

Regeneration of the Catalyst

To applicant's knowledge, there are only two techniques which have been developed for regenerating poisoned Claus catalyst.

The first such technique involves a series of steps carried out while the poisoned catalyst remains in place in the converters (in situ regeneration). In this process, the operating temperature in the converters is raised well above the sulfur dew point and maintained at that level for 24-36 hours while a dilute $H_2S$-$SO_2$ stream is circulated through the reactor. Under these conditions sulfur is volatilized and removed.

The catalyst is then subjected to an oxidative burn-off using air, to remove carbon, at a temperature in the order of 450°-550° C. However, under this oxidative environment any residual sulfur adsorbed on the catalyst can lead to sulfate formation. To reduce the $SO_4^{32}$ content, a 4:1 $H_2S/SO_2$ mixture is subsequently flowed through converters, to reduce the aluminum sulfate to aluminum sulfide.

This in situ regeneration can take up to two weeks to complete and the degree of regeneration is often unsatisfactory and unreliable.

The other regeneration technique referred to is described in my U.S. Pat. No. 4,183,823. This process involves removing the poisoned catalyst from the converters, regenerating it, and returning it to the converters. The regeneration procedure comprises:

(1) leaching the aluminum sulfate and other soluble impurities from the catalyst using hot water;
(2) drying the catalyst;
(3) subjecting the catalyst to an oxidative burn-off to remove the adsorbed sulfur and carbon;
(4) and repeating the leach, if $SO_4^{32}$ content is high.

The drying step is necessary, as the presence of water during the oxidative burn-off step results in enhanced sintering of the catalyst and loss of reactive surface area.

When this patented process was examined for commercial application, it was found that the leaching and drying steps were expensive and detracted from the commercial viability of the process. Also, it was found that the activity of the regenerated catalyst was not consistent from one batch to another.

SUMMARY OF THE PRESENT INVENTION

In accordance with the present invention, it has been discovered that regeneration of poisoned Claus catalyst can be achieved by a process comprising:

(1) first subjecting the catalyst to an oxidative burn-off, to remove sulfur and carbon, followed by
(2) contacting the catalyst with a base, such as NaOH, to enhance the activity of the catalyst and to reduce sulfate content.

The catalyst regenerated in this manner was found to have a Claus activity close to that of fresh catalyst, an increased surface area, and significantly reduced carbon and sulfur contents.

DESCRIPTION OF THE DRAWINGS

FIG. 6 is a plot of the activity profile for fresh alumina catalyst.

DESCRIPTION OF THE PREFERRED EMBODIMENT

The invention is illustrated by the following examples:

EXAMPLE I

This example sets forth the best mode known to Applicant for practising the process.

Figure 1:
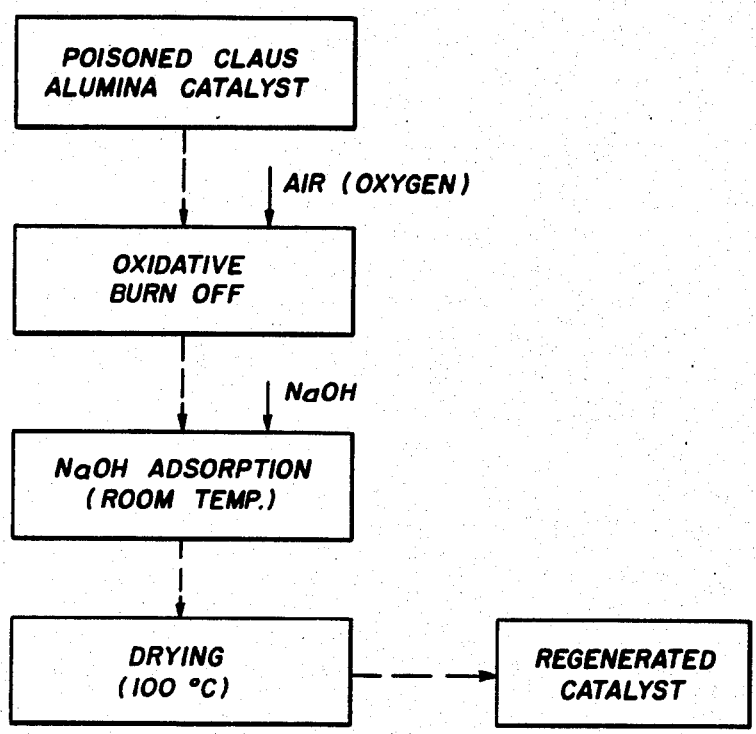
FIG. 1 is a block diagram setting forth the steps of the process.
Figure 2:
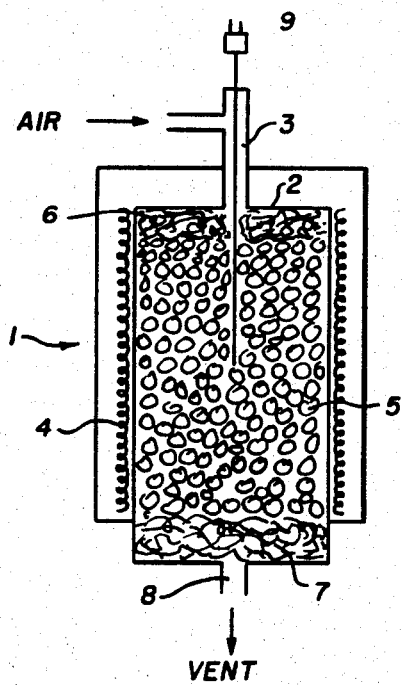
FIG. 2 is a schematic diagram showing the apparatus and setting forth the conditions used to conduct the oxidative burn-off.

Having reference to FIG. 2, 500 grams of poisioned alumina catalyst, corresponding to the description of Table II above, were placed in a furnace 1 to carry out an oxidative burn-off.

The furnace 1 comprised a steel vessel 2 having an inlet 3, at its upper end, connected to a source (not shown) of pressurized air. The vessel was insulated and heated with external electric heating elements 4. The catalyst charge 5 was packed within the vessel 2 between upper and lower layers 6, 7 of glass wool. An outlet 8 was provided at the base of the vessel 2, for the removal of gaseous products. A thermocouple 9 was provided to measure the temperature within the catalyst charge.

The catalyst charge was heated at a rate of 20° C./minute in a flow of purified laboratory air of 500 ml./minute at atmospheric pressure to 500°–530° C. and then maintained at this temperature for 6 hours. Product gases, comprising mainly unused air, $SO_2$ and $CO_2$, were vented after scrubbing with NaOH solution.

The catalyst charge was then cooled to room temperature and part of it was contacted with a base (NaOH) as follows.

A portion of 100 grams of the catalyst from the burn-off step was stirred into 150 ml. of 1.0 molar aqueous NaOH solution, at room temperature. The mixture was left for 2 hours with periodic gentle stirring. At the end of the 2 hours, the excess of NaOH was decanted and discarded. The catalyst was dried in an air oven at 100° C.

Figure 3:
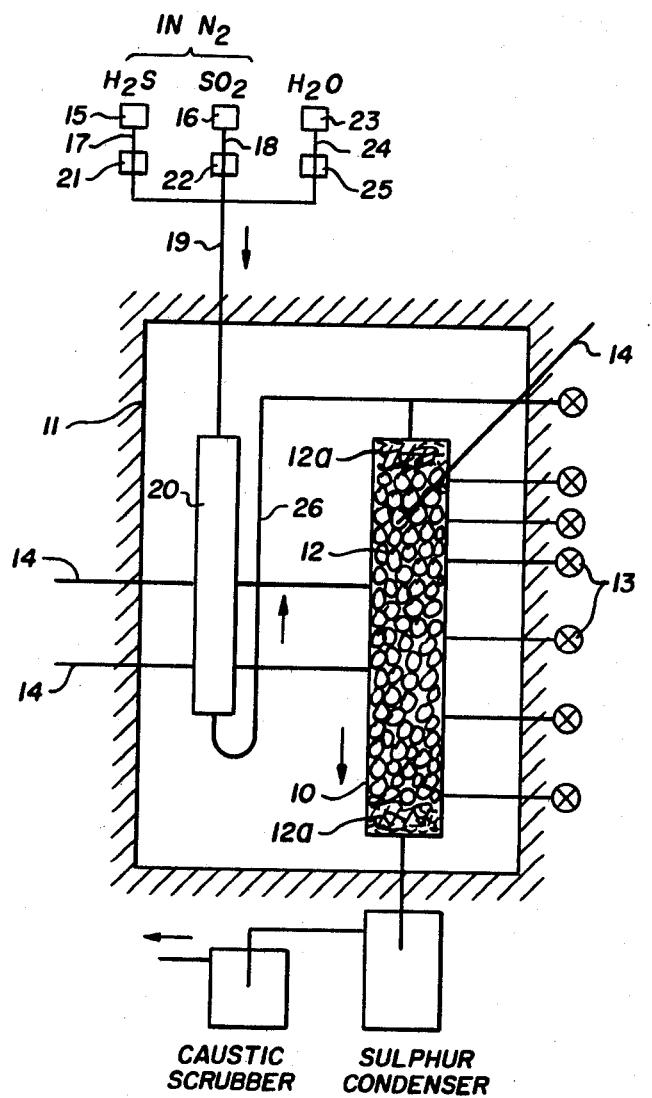
FIG. 3 is a schematic diagram showing the reactor apparatus used to carry out the Claus reaction to test the performance of catalyst batches.

The catalyst activity with respect to the Claus reaction was tested in the laboratory scale Claus reactor shown in FIG. 3, as follows. About 80 grams of the regenerated catalyst were packed into a tubular stainless steel reactor 10. The reactor 10 was positioned within a furnace 11.

Immediately above the top and bottom of the catalyst bed 12, one centimeter thick layers 13 of stainless steel wire gauze were packed.

Close to 60% of the $H_2S$ conversion takes place within a narrow catalyst section at the top of the bed. Consequently, sampling ports 13 were spaced along the length of the reactor, such that a range of conversion could be obtained to enable extrapolation to zero conversion. The reactor was also provided with three thermocouples 14.

Separate sources 15, 16 of hydrogen sulphide in nitrogen and sulphur dioxide in nitrogen, respectively, were connected through lines 17, 18 and 19 to a heat exchanger 20. Flow to the heat exchanger was controlled by micrometering valves 21, 22. A separate source 23 supplied water through line 24 and metering pump 25 to join with the mixture entering the heat exchanger.

A gas chromatograph (not shown) was used for sampling and analysis of both feed and products streams at will.

Laboratory determinations of the catalytic activity of the catalyst were performed at 300° C. The catalyst was activated by heating to and maintaining it at 300° C. in flowing nitrogen for 4 hours. Then the reactants were introduced into the reactor. The inlet composition of the feed was maintained at 36 torr $H_2S$, 18 torr $SO_2$, 210 torr $H_2O$ and the balance made up to slightly above atmospheric pressure with $N_2$. The total gas flow rate through the reactor was 3 liters/min.

Once the reactor temperature, partial pressures, and flow rates of the reactants had stabilized, approximately 4 hours after startup, samples of the reactor contents were taken from the ports 13 through a line (not shown) connected with the gass chromatograph. The flow rate through the sample system was 75 ml/min., about 4 percent of the total flow. Using a six port sample valve (not shown), a 2.0 ml sample of feed or product stream, including water, could be analyzed by gas chromotography in about 7 minutes. For each sample port located at a different depth along the bed, at least 4 samples were analyzed and the average taken. Repeat analyses of the feed or product samples agreed within 3 percent.

The rate of Claus reaction was determined from the consumption of $H_2S$, since the peaks of the gas chromatogram for $SO_2$ and $H_2O$ showed tails. The initial slopes of the activity profiles seen in FIGS. 5 and 6 (which represent initial rate of reaction) and the activity profile which represents $H_2S$ conversion along the entire bed length, were used for Claus activity comparisons set forth in said FIGS.

EXAMPLE II

The procedure of Example I was practised on a number of poisoned catalyst samples in accordance with Table II, while the time on stream was varied. The results for a catalyst are shown in FIG. 5 in activity profile form.

The procedure of Example I was practised for a fresh catalyst sample, while the time on stream was varied. The results are shown in FIG. 6 in activity profile form.

Figure 5:
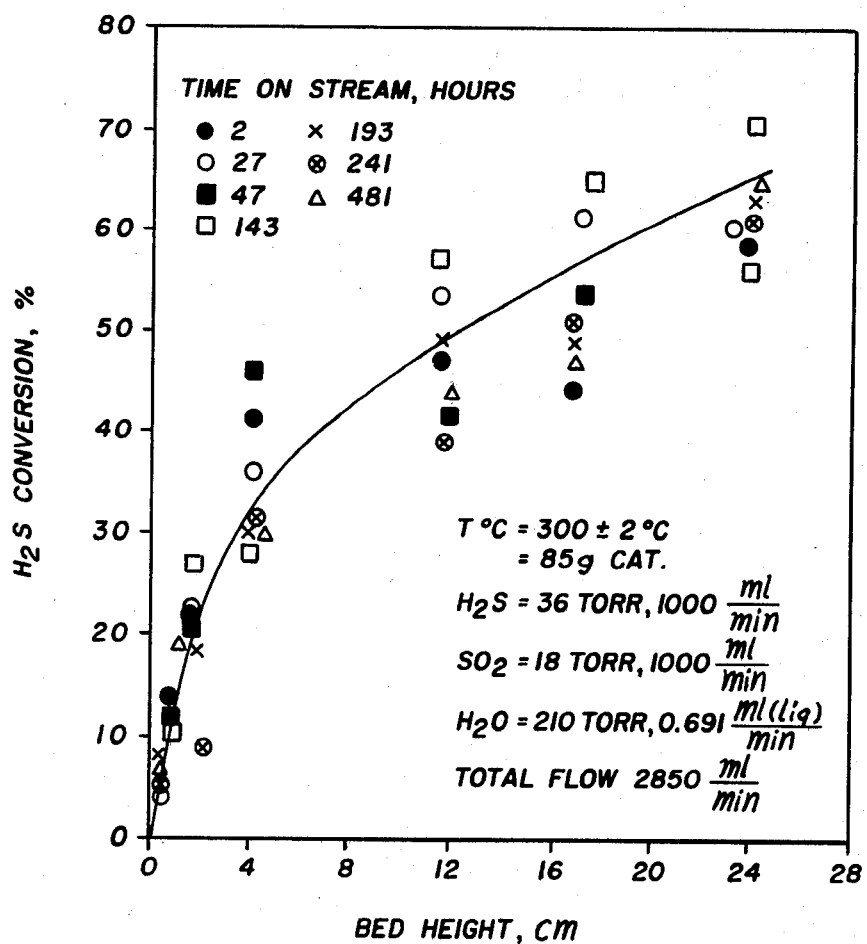
FIG. 5 is a plot of the activity profile for regenerated alumina catalyst.

A comparison of the results in FIGS. 5 and 6 indicates that the activity of the regenerated sample was comparable to that of the fresh sample.

EXAMPLE III

Figure 4:
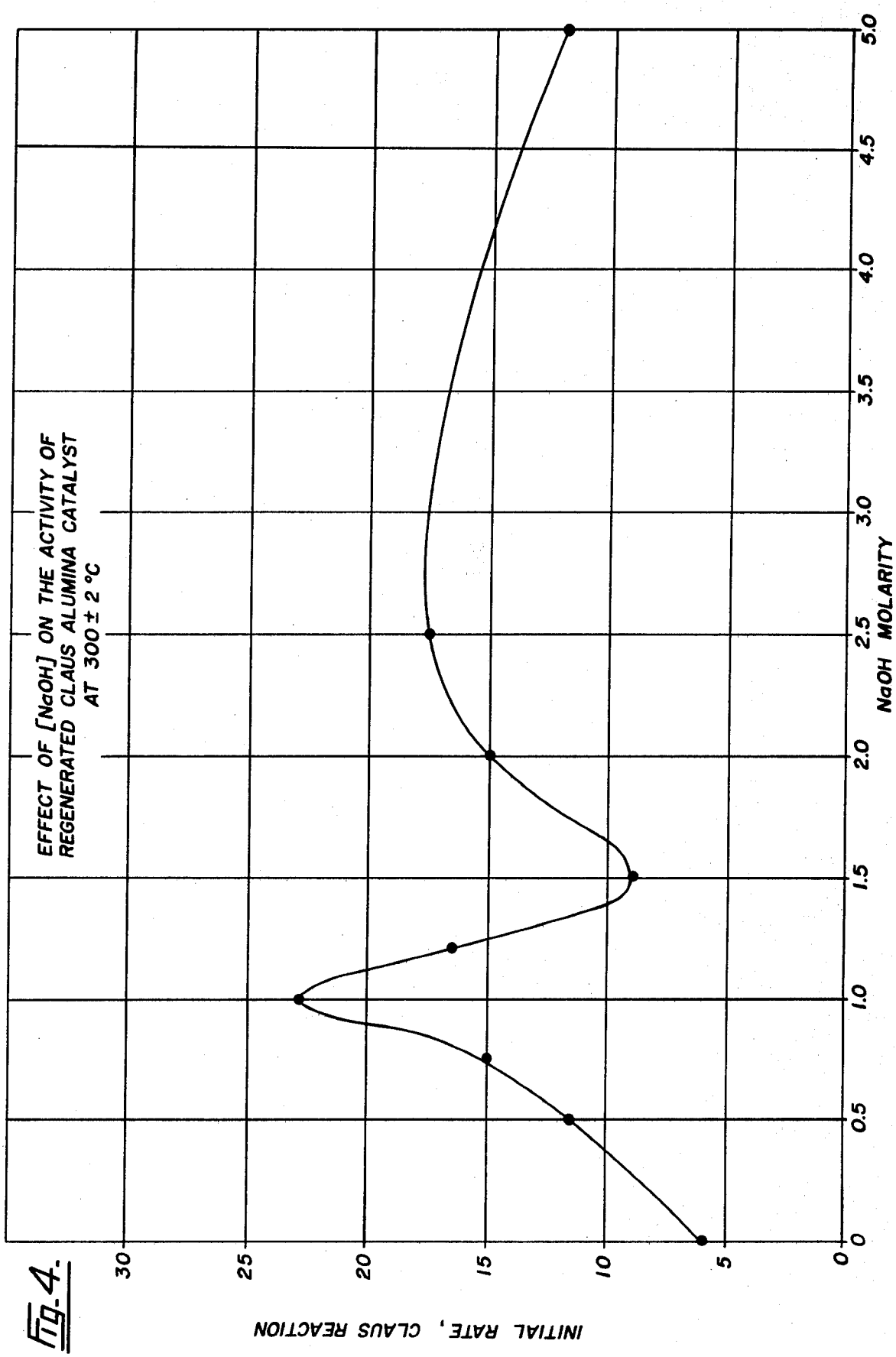
FIG. 4 is a plot of the effect of NaOH concentration on the Claus catalytic activity.

The procedure of Example I was practised on a number of catalyst samples in accordance with Table II, except that the molarity of the NaOH solution was varied, as set forth in FIG. 4. It will be noted that the activity of the regenerated catalyst was at a maximum when a molarity of 0.75 to 1.25, most preferably about 1.0, was used.

The embodiments of the invention in which an exclusive property of privilege is claimed are defined as follows:

1. A process for regenerating an alumina catalyst poisoned by use in modified Claus reaction converters and being contaminated with carbon, sulfur and sulfate and having a low surface area, comprising:
   (a) first subjecting the catalyst to an oxidative burn-off to remove sulfur and carbon;
   (b) then contacting the catalyst with a base to produce a catalyst with enhanced Claus activity.

2. The process as set forth in claim 1 wherein the base used is aqueous sodium hydroxide solution.

3. The process as set forth in claim 1 wherein the base used is 0.75 to 1.25 molar aqueous sodium hydroxide solution.

4. The process as set forth in claim 3 wherein the burn-off is conducted at a temperature in the range of 500°–530° C., and an excess of sodium hydroxide solution, over that needed to fill the pore volume of the catalyst, is used.

* * * * *